United States Patent [19]
Hughes

[11] 3,848,652
[45] Nov. 19, 1974

[54] INNER TUBE SEALING MEANS

[76] Inventor: George W. Hughes, 2601 Mills, Houston, Tex. 77026

[22] Filed: Oct. 11, 1973

[21] Appl. No.: 405,472

[52] U.S. Cl.......... 152/427, 52/330 RF, 152/362 R, 152/415
[51] Int. Cl. .......................................... B60c 29/00
[58] Field of Search........ 152/362 R, 365, 366, 405, 152/400, 415, 427, 429, 330 RF

[56] References Cited
UNITED STATES PATENTS

| | | | |
|---|---|---|---|
| 1,264,537 | 4/1918 | McLean | 152/365 |
| 1,886,470 | 11/1932 | Daddio | 152/366 |
| 2,787,312 | 4/1957 | Servaes | 152/366 |
| 3,195,605 | 7/1965 | Mayfield | 152/429 |
| 3,542,110 | 11/1970 | Holl | 152/429 |
| 3,722,569 | 3/1973 | Hughes | 152/429 |

Primary Examiner—Drayton E. Hoffman

[57] ABSTRACT

This is a means for sealing an inner tubing within a casing, or tire, particularly for wheel rims having two pieces, such as on trucks, and having means for sealing the inner tube in the casing consisting of a flexible seal between the casing and rim and means for preventing air leakage from the casing in the event of rupture of the inner tube, comprising a lock for said flexible member anchoring the flexible member to the wheel rim, and covering the valve stem opening in the rim, and having means for introducing air between said inner tube and said flexible member to accomplish the desired seal.

5 Claims, 2 Drawing Figures

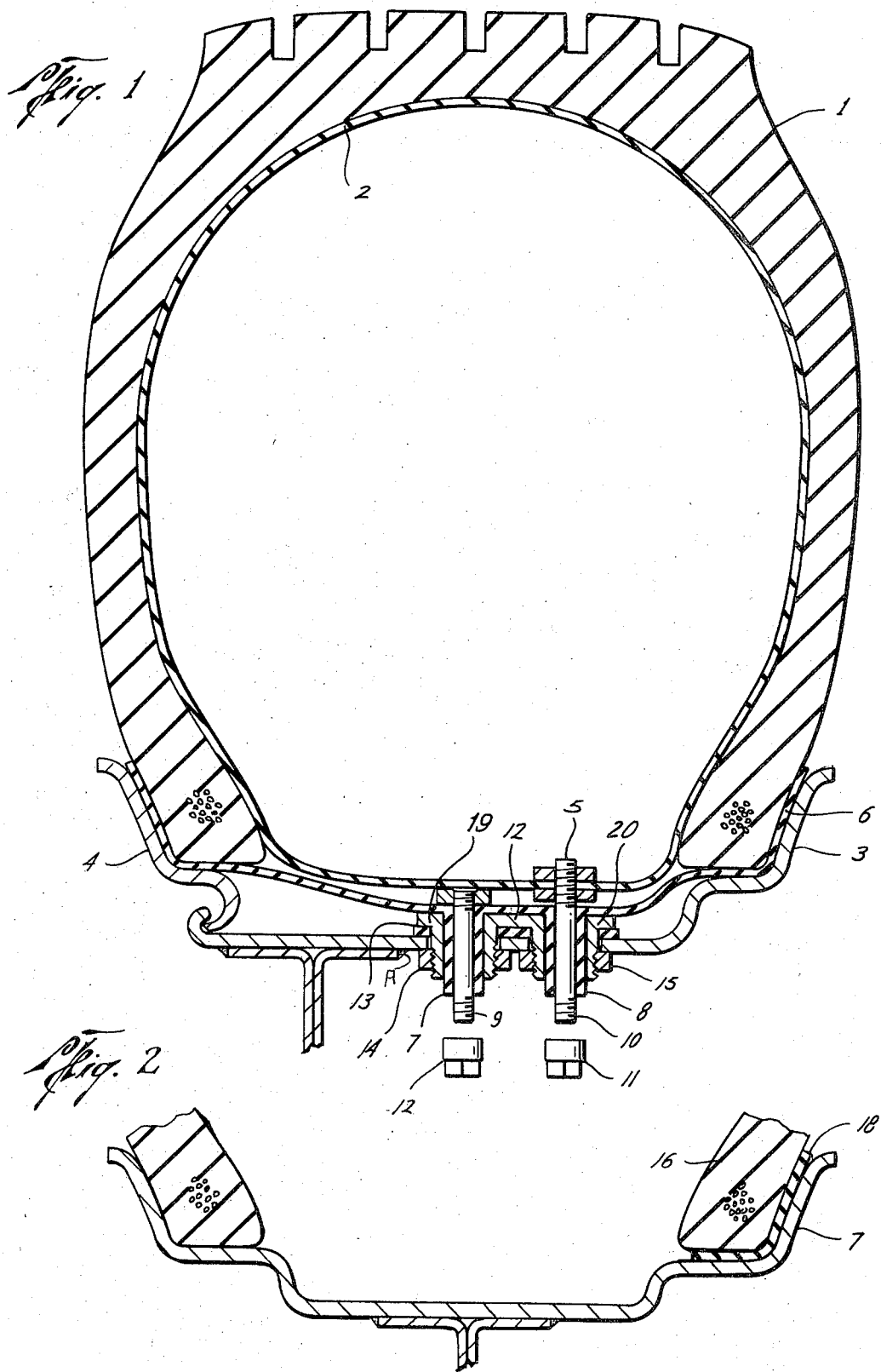

INNER TUBE SEALING MEANS

BACKGROUND OF THE INVENTION

This is an improvement over the patent issued to applicant, U.S. Pat. No. 3,722,569, on an Inner tube sealing means.

SUMMARY OF THE INVENTION

A means for insertion between a tire rim and casing having a valve for introducing air under pressure into the area between the inner tube and rims, said means covering the valve stem opening in the rim and effecting a seal between the inner tube and rim, after the inner tube has been inflated.

BRIEF DESCRIPTION OF THE DRAWINGS

FIG. 1 is a front elevational view, in cross section, of a tire casing with the seal mounted therein, and FIG. 2 is a fragmentary view of a modification of the invention, illustrating the means employed for sealing a tire having a single piece rim.

DESCRIPTION OF THE PREFERRED EMBODIMENTS

In the drawings, the numeral 1 designates a tire casing in which the inner tube 2 is mounted. The tire is mounted on the rim composed of the parts 3, 4. The inner tube has the valve stem 5 which extends through the flexible sealing member 6 and the sealing member 6 is provided with the valve stem conduits 7 and 8, the valve stem 5 being inserted through the conduit 8, and a separate valve stem 9 extending through the conduit 7, and terminating in the area between the inner tube 2 and the sealing member 6. The sealing member 6 extends all the way around the inner periphery of the casing 1, the side margins extending beyond the beads of the casing, and extending beyond the outer margin of the tim sections 3, 4.

Each rim is equipped with a large valve stem opening A through which the valve stems extends. A rigid member 13, having the conduits 19, 20, is mounted adjacent the inside wall of the rim section 3, and is of sufficient width and length to cover the valve stem opening in the rim. The conduits 19, 20 receive the valve stem conduits 7, 8 and the extended ends of the conduits 19, 20 are externally threaded to receive the nuts 14, 15, which anchor the valve stems in place on the rim. Nuts 11, 12 are received by the external threads on the valve stems 9, 10 for a similar purpose.

When the inner tube 2 is mounted in the casing 1, the seal 6 is mounted on the inner periphery of the casing, with the conduits 7, 8 extending through the openings in the rim, and the valve stems 9, 10 extending through the conduits 7, 8. The rigid member 13 is then mounted on the conduits 7, 8 with the said conduits extending through the conduits 19, 20. The side margins of the seal extend beyond the outside edges of the rim sections 3, 4 and lie between the beads of the casing and the inner surface of the rim, and the valve stems and the conduits in which they are mounted extend through the valve stem openings in the rim. The nuts 14, 15 are mounted on the conduits 19, 20, and are tightened to draw the member 12 snugly against the rim section 3. The nuts 11, 12 are then mounted on the stems 9, 10 and tightened to anchor the stems 9, 10 in place. Air may then be pumped into the inner tube 2 through the valve stem 10, and into the area between the inner tube and the casing through the valve stem 9, pressing the seal 6 firmly against the outer surface of the rim.

In the event of a rupture of the inner tube such as puncturing same with a nail or the like, the tire will not deflate, but may continue in use until the truck reaches an area where tire service may be obtained. The air in the inner tube will normally escape through the area between the inner tube and the rim, where a conventional wheel and tire are employed, the hole in the casing being filled with the nail or other object causing the puncture, thus preventing escape of air therethrough. In applicant's device, the air escaping through the area between the inner tube and casing 1 being unable to escape from the casing due to the sealing member 6 and the tire will remain inflated until it may be properly repaired or the object puncturing the casing is removed.

In the form shown in FIG. 2, where a single piece rim is employed, the sealing member employed consists of the flexible annular member 18 which may be inserted between the rim 17 and the bead of the tire 16. Here a tubeless casing may be continued in use where it is reparable without the need of an inner tube, the pressure of air pumped into the inner tube being maintained by the flexible seal.

What I claim is:

1. In a means for sealing an inner tube in a tire casing mounted on a wheel rim, an inner tube having a valve stem, a flexible member mounted between said inner tube and rim, valve stem extending through said flexible member and terminating between said member and said inner tube, means for maintaining said valve stems in position of the rim.

2. The device defined in claim 1 wherein said flexible member is movable tightly against said rim when air is inserted through said valve stem therein.

3. The device claimed in claim 1 wherein said flexible member has a pair of outwardly extending conduits adapted to extend through said rim and to receive said valve stems.

4. The device defined in claim 1 wherein said means for maintaining said valve in position on said wheel rim consists of a rigid body having a flexible lining on one surface and having a pair of outwardly extending conduits in which said conduits on said flexible member extend, said means for maintaining said valve stems in position on said wheel rim having external threads on the extending ends thereof, and nuts mountable on said externally threaded ends adapted to maintain said last mentioned means in position on said rim.

5. The device defined in claim 1 wherein said means for maintaining said valve stems in position on said wheel rim have outwardly extending conduits through which said conduits on said flexible member extend, and having flexible means on one surface adapted to bear against the wheel rim when air is introduced through said valve stem extending through said flexible member and terminating between said inner tube and said flexible member.

* * * * *